US008420160B2

(12) United States Patent
Sagawa

(10) Patent No.: US 8,420,160 B2
(45) Date of Patent: *Apr. 16, 2013

(54) METHOD FOR PRODUCING SINTERED NDFEB MAGNET

(75) Inventor: Masato Sagawa, Kyoto (JP)

(73) Assignee: Intermetallics Co., Ltd., Kyoto-shi (JP)

( * ) Notice: Subject to any disclaimer, the term of this patent is extended or adjusted under 35 U.S.C. 154(b) by 838 days.

This patent is subject to a terminal disclaimer.

(21) Appl. No.: 12/441,124

(22) PCT Filed: Jul. 23, 2007

(86) PCT No.: PCT/JP2007/000789

§ 371 (c)(1),
(2), (4) Date: Mar. 12, 2009

(87) PCT Pub. No.: WO2008/032426

PCT Pub. Date: Mar. 20, 2008

(65) Prior Publication Data

US 2009/0252865 A1 Oct. 8, 2009

(30) Foreign Application Priority Data

Sep. 15, 2006 (JP) ................................ 2006-250462

(51) Int. Cl.
*G11B 5/00* (2006.01)
*H01F 1/00* (2006.01)
*H01F 1/053* (2006.01)

(52) U.S. Cl.
USPC ............................ 427/130; 427/128; 427/132

(58) Field of Classification Search ........... 427/127–131
See application file for complete search history.

(56) References Cited

U.S. PATENT DOCUMENTS 5,273,782 A 12/1993 Sagawa et al.
6,261,515 B1 * 7/2001 Ren et al. ........................ 419/66
(Continued)

FOREIGN PATENT DOCUMENTS

EP 0 528 292 A1 2/1993
EP 1 643 513 A1 4/2006
(Continued)

OTHER PUBLICATIONS

Nakamura "Magnetic Properties of Extremely Small Nd-Fe-B Sintered Magnets" Oct. 2005, Trans. on Magn. p. 3844-3846.*

(Continued)

*Primary Examiner* — Timothy Meeks
*Assistant Examiner* — Mandy Louie
(74) *Attorney, Agent, or Firm* — Oliff & Berridge, PLC

(57) ABSTRACT

The present invention provides a method for producing a sintered NdFeB magnet having high coercivity and capable of being brought into applications without lowering its residual magnetic flux density or maximum energy product and without reprocessing. The method for producing a sintered NdFeB magnet according to the present invention includes applying a substance containing dysprosium (Dy) and/or terbium (Tb) to the surface of the sintered NdFeB magnet forming a base body and then heating the magnet to diffuse Dy and/or Tb through the grain boundary and thereby increase the coercivity of the magnet. This method is characterized in that: (1) the substance containing Dy or Tb to be applied to the surface of the sintered NdFeB magnet is substantially a metal powder; (2) the metal powder is composed of a rare-earth element R and an iron-group transition element T, or composed of R, T and another element X, the element X capable of forming an alloy or intermetallic compound with R and/or T; and (3) the oxygen content of the sintered NdFeB magnet forming the base body is 5000 ppm or lower. The element T may contain nickel (Ni) or cobalt (Co) to produce an anticorrosion effect.

19 Claims, 7 Drawing Sheets

U.S. PATENT DOCUMENTS

| | | | | |
|---|---|---|---|---|
| 7,053,745 | B2 * | 5/2006 | Yoshimura et al. | 335/302 |
| 2004/0050454 | A1 * | 3/2004 | Sekino et al. | 148/105 |
| 2006/0278517 | A1 * | 12/2006 | Machida et al. | 204/192.1 |
| 2007/0240789 | A1 * | 10/2007 | Nakamura et al. | 148/101 |

FOREIGN PATENT DOCUMENTS

| | | | |
|---|---|---|---|
| JP | A-62-074048 | | 4/1987 |
| JP | A-01-117303 | | 5/1989 |
| JP | A-05-302176 | | 11/1993 |
| JP | A-07-122414 | | 5/1995 |
| JP | 07-302705 | * | 11/1995 |
| JP | A-07-302705 | | 11/1995 |
| JP | A-2004-304038 | | 10/2004 |
| JP | A-2007-05335 1 | | 3/2007 |
| RU | 2055695 | * | 3/1996 |
| WO | WO 2004/008683 A2 | | 1/2004 |

OTHER PUBLICATIONS

Extended Search Report issued in corresponding European Patent Application No. 07790283.1 dated Apr. 6, 2011.

Park et al., "Effect of Metal-Coating and Consecutive Heat Treatment on Coercivity of Thin Nd-Fe-B Sintered Magnets", *Proceedings of the Sixteenth International Workshop on Rare-Earth Magnets and Their Applications*, 2000, pp. 257-264.

Ishigaki et al., "Surface Improvements on Magnetic Properties of Small-Sized Nd-Fe-B Sintered Magnets", *Neomax Technical Report*, 2005, pp. 15-19, vol. 15.

Machida et al., "Grain Boundary Modification and Magnetic Characteristics of Sintered NdFeB Magnet", *Speech Summaries of 2004 Spring Meeting of Japan Society of Powder and Powder Metallurgy*, 2004.

Hirota et al., "Increase in Coercivity of Sintered NdFeB Magnet by Grain Boundary Diffusion Method", *Speech Summaries of 2005 Spring Meeting of Japan Society of Powder and Powder Metallurgy*, 2005, p. 143.

Machida et al., "Magnetic Characteristics of Sintered NdFeB Magnet with Modified Grain Boundary", *Speech Summaries of 2005 Spring Meeting of Japan Society of Powder and Powder Metallurgy*, 2005 p. 144.

Fukuda et al., "Magnetic Properties and Corrosion Characteristics of Nd-(Fe, Co, Ni)-B Pseudo-Ternary Systems", *Kawasaki Steel Technical Report*, 1989, pp. 312-315, vol. 21., No. 4.

Hirota et al., "Increase in Coercivity of Sintered NdFeB Magnet by Grain Boundary Diffusion Method", *Abstracts of Autumn Meeting of Japan Society of Powder and Powder Metallurgy*, 2005, p. 143.

Machida et al., "Magnetic Characteristics of Sintered NdFeB Magnet with Modified Grain Boundary", *Abstracts of Autumn Meeting of Japan Society of Powder and Powder Metallurgy*, 2005, p. 144.

Mar. 7, 2012 Chinese Office Action issued in Chinese Patent Application No. 200780034297.1.

* cited by examiner

Fig. 1

| ALLOY NO. | Nd | Dy | Tb | Ni | Co | B | Al | Cu | Cr | Ti | Sn | Fe |
|---|---|---|---|---|---|---|---|---|---|---|---|---|
| A-1 | 14.0 | 19.0 | — | 13.14 | 19.71 | 1 | 0.2 | 0.1 | — | 0.99 | — | REMNANT |
| A-2 | 10.0 | 25.0 | — | 18.9 | 12.6 | 1 | 1.0 | — | — | — | — | REMNANT |
| A-3 | 10.0 | 23.0 | — | 18.9 | 12.6 | 3 | 1.0 | — | — | — | — | REMNANT |
| A-4 | 10.0 | 23.0 | — | 16.8 | 11.2 | 1 | 10.0 | — | — | — | — | REMNANT |
| A-5 | 10.0 | 25.0 | — | 18.9 | 6.3 | 1 | 1.0 | — | 6.3 | — | — | REMNANT |
| A-6 | 10.0 | 23.0 | — | 16.5 | 11.0 | 1 | 1.0 | — | — | — | 10.0 | REMNANT |
| A-7 | 10.0 | — | 25.0 | 18.9 | 12.6 | 1 | 1.0 | — | — | — | — | REMNANT |
| A-8 | 10.0 | 25.0 | — | 18.9 | 12.6 | 1 | 1.0 | — | — | 1.3 | — | REMNANT |
| A-9 | 23.0 | 10.0 | — | — | — | 1 | 0.3 | 0.1 | — | — | — | REMNANT |

(UNIT OF NUMERICAL VALUES : % BY WEIGHT)

Fig. 2

| POWDER NO. | ALLOY CONTAINING Dy OR Tb | | | OTHER METAL POWDERS (%) | | | | | |
|---|---|---|---|---|---|---|---|---|---|
| | ALLOY NO. | GRAIN SIZE (μm) | PROPORTION (%) | Al | Cu | Ni | Co | Mn | Sn |
| P-1 | A-1 | 3 | 100 | — | — | — | — | — | — |
| P-2 | A-2 | 3 | 100 | — | — | — | — | — | — |
| P-3 | A-3 | 3 | 100 | — | — | — | — | — | — |
| P-4 | A-4 | 3 | 100 | — | — | — | — | — | — |
| P-5 | A-5 | 3 | 100 | — | — | — | — | — | — |
| P-6 | A-6 | 3 | 100 | — | — | — | — | — | — |
| P-7 | A-7 | 3 | 100 | — | — | — | — | — | — |
| P-8 | A-8 | 3 | 100 | — | — | — | — | — | — |
| P-9 | A-9 | 3 | 100 | — | — | — | — | — | — |
| P-10 | A-2 | 3 | 95 | 5 | — | — | — | — | — |
| P-11 | A-2 | 3 | 90 | 10 | — | — | — | — | — |
| P-12 | A-2 | 3 | 80 | 20 | — | — | — | — | — |
| P-13 | A-2 | 3 | 70 | 30 | — | — | — | — | — |
| P-14 | A-2 | 3 | 85 | 10 | 5 | — | — | — | — |
| P-15 | A-2 | 3 | 85 | 5 | 10 | — | — | — | — |
| P-16 | A-2 | 3 | 80 | 10 | 10 | — | — | — | — |
| P-17 | A-2 | 3 | 70 | 10 | 20 | — | — | — | — |
| P-18 | A-1 | 2 | 100 | — | — | — | — | — | — |
| P-19 | A-1 | 1.5 | 100 | — | — | — | — | — | — |
| P-20 | A-1 | 2 | 90 | 10 | — | — | — | — | — |
| P-21 | A-1 | 1.5 | 90 | 10 | — | — | — | — | — |
| P-22 | A-9 | 3 | 95 | — | — | 5 | — | — | — |
| P-23 | A-9 | 3 | 95 | — | — | — | 5 | — | — |
| P-24 | A-9 | 3 | 95 | — | — | — | — | 5 | — |
| P-25 | A-9 | 3 | 95 | — | — | — | — | — | 5 |
| P-26 | A-5 | 3 | 90 | 10 | — | — | — | — | — |
| P-27 | A-8 | 3 | 90 | 10 | — | — | — | — | — |
| P-28 | A-1 | 3 | 90 | 10 | — | — | — | — | — |
| P-29 | A-9 | 3 | 90 | 10 | — | — | — | — | — |

Fig. 5

| ALLOY NO. | Nd | Pr | Dy | Co | Al | Cu | B | Fe |
|---|---|---|---|---|---|---|---|---|
| M-1 | 26.4 | 4.6 | – | 1 | 0.26 | 0.09 | 1 | REMNANT |
| M-2 | 28.5 | – | 3 | – | 0.2 | 0.1 | 0.98 | REMNANT |
| M-3 | 30.5 | – | – | – | 0.2 | 0.1 | 0.99 | REMNANT |
| M-4 | 31.5 | – | – | – | 0.2 | 0.1 | 0.99 | REMNANT |

(UNIT OF NUMERICAL VALUES : % BY WEIGHT)

Fig. 6

| MAGNET SAMPLE NO. | ALLOY NO. | GRAIN SIZE (μm) | ADDITION OF OXYGEN |
|---|---|---|---|
| R-1 | M-1 | 3 | NO |
| R-2 | M-2 | 3 | NO |
| R-3 | M-3 | 3 | NO |
| R-4 | M-4 | 3 | NO |
| R-5 | M-1 | 5 | NO |
| R-6 | M-1 | 5 | YES |

Fig. 7

| MAGNET SAMPLE NO. | $B_r$ (kG) | $H_{cJ}$ (kOe) | $(BH)_{max}$ (MGOe) | $H_k/H_{cJ}$ (%) |
|---|---|---|---|---|
| R-1 | 14.171 | 16.089 | 49.24 | 88.6 |
| R-2 | 13.461 | 20.793 | 44.34 | 95.7 |
| R-3 | 14.545 | 13.213 | 51.74 | 84.9 |
| R-4 | 14.318 | 14.426 | 49.98 | 91.7 |
| R-5 | 13.851 | 13.410 | 46.51 | 85.5 |
| R-6 | 14.279 | 11.324 | 49.63 | 84.7 |

Fig. 8

| SAMPLE NO. | MAGNET SAMPLE NO. | POWDER NO. | CONDITION OF GRAIN BOUNDARY DIFFUSION | |
|---|---|---|---|---|
| | | | TEMP.(℃) | TIME(h) |
| S-1 | R-5 | P-1 | 900 | 1 |
| S-2 | R-5 | P-2 | 900 | 1 |
| S-3 | R-5 | P-3 | 900 | 1 |
| S-4 | R-5 | P-4 | 900 | 1 |
| S-5 | R-5 | P-5 | 900 | 1 |
| S-6 | R-5 | P-6 | 900 | 1 |
| S-7 | R-5 | P-7 | 900 | 1 |
| S-8 | R-5 | P-8 | 900 | 1 |
| S-9 | R-5 | P-9 | 900 | 1 |
| S-10 | R-5 | P-10 | 900 | 1 |
| S-11 | R-5 | P-11 | 900 | 1 |
| S-12 | R-5 | P-12 | 900 | 1 |
| S-13 | R-5 | P-13 | 900 | 1 |
| S-14 | R-5 | P-14 | 900 | 1 |
| S-15 | R-5 | P-15 | 900 | 1 |
| S-16 | R-5 | P-16 | 900 | 1 |
| S-17 | R-5 | P-17 | 900 | 1 |
| S-18 | R-5 | P-18 | 900 | 1 |
| S-19 | R-5 | P-19 | 900 | 1 |
| S-20 | R-5 | P-20 | 900 | 1 |
| S-21 | R-5 | P-21 | 900 | 1 |
| S-22 | R-5 | P-22 | 900 | 1 |
| S-23 | R-5 | P-23 | 900 | 1 |
| S-24 | R-5 | P-24 | 900 | 1 |
| S-25 | R-5 | P-25 | 900 | 1 |

| SAMPLE NO. | MAGNET SAMPLE NO. | POWDER NO. | CONDITION OF GRAIN BOUNDARY DIFFUSION | |
|---|---|---|---|---|
| | | | TEMP.(℃) | TIME(h) |
| S-26 | R-5 | P-4 | 800 | 10 |
| S-27 | R-5 | P-21 | 800 | 10 |
| S-28 | R-5 | P-11 | 800 | 10 |
| S-29 | R-5 | P-10 | 800 | 10 |
| S-30 | R-5 | P-19 | 800 | 10 |
| S-31 | R-1 | P-4 | 800 | 10 |
| S-32 | R-1 | P-7 | 900 | 1 |
| S-33 | R-1 | P-11 | 800 | 10 |
| S-34 | R-1 | P-4 | 900 | 1 |
| S-35 | R-1 | P-1 | 900 | 1 |
| S-36 | R-1 | P-26 | 800 | 10 |
| S-37 | R-1 | P-27 | 800 | 10 |
| S-38 | R-1 | P-28 | 900 | 1 |
| S-39 | R-1 | P-29 | 900 | 1 |
| S-40 | R-2 | P-1 | 900 | 1 |
| S-41 | R-2 | P-29 | 800 | 10 |
| S-42 | R-3 | P-29 | 800 | 10 |
| S-43 | R-3 | P-1 | 900 | 1 |
| S-44 | R-4 | P-29 | 800 | 10 |
| S-45 | R-4 | P-29 | 900 | 1 |
| S-46 | R-6 | P-1 | 900 | 1 |
| S-47 | R-6 | P-2 | 900 | 1 |
| S-48 | R-6 | P-18 | 900 | 1 |
| S-49 | R-6 | P-19 | 900 | 1 |

Fig. 9

| SAMPLE NO. | $B_r$ (kG) | $H_{cJ}$ (kOe) | $(BH)_{max}$ (MGOe) | $H_k/H_{cJ}$ (%) |
|---|---|---|---|---|
| S-1 | 13.932 | 18.109 | 47.09 | 72.4 |
| S-2 | 13.744 | 20.061 | 45.87 | 62.4 |
| S-3 | 13.963 | 16.778 | 47.38 | 74.6 |
| S-4 | 13.680 | 20.005 | 45.44 | 63.7 |
| S-5 | 13.852 | 18.478 | 46.62 | 71.0 |
| S-6 | 13.759 | 16.795 | 45.91 | 70.6 |
| S-7 | 13.848 | 20.214 | 46.54 | 59.6 |
| S-8 | 13.900 | 17.574 | 46.94 | 69.5 |
| S-9 | 13.976 | 16.692 | 47.39 | 72.0 |
| S-10 | 13.681 | 19.646 | 45.45 | 62.9 |
| S-11 | 13.761 | 19.868 | 46.03 | 68.8 |
| S-12 | 13.657 | 18.588 | 45.33 | 71.8 |
| S-13 | 13.536 | 17.526 | 44.51 | 70.7 |
| S-14 | 13.698 | 19.937 | 45.62 | 72.1 |
| S-15 | 13.741 | 19.196 | 45.81 | 64.5 |
| S-16 | 13.847 | 19.361 | 46.58 | 66.5 |
| S-17 | 13.671 | 18.327 | 45.39 | 67.4 |
| S-18 | 13.867 | 17.470 | 46.60 | 67.4 |
| S-19 | 13.930 | 17.750 | 47.01 | 73.3 |
| S-20 | 13.778 | 17.799 | 46.02 | 69.6 |
| S-21 | 13.765 | 18.132 | 46.13 | 70.2 |
| S-22 | 13.852 | 16.522 | 47.02 | 70.2 |
| S-23 | 13.933 | 16.711 | 47.33 | 70.0 |

| SAMPLE NO. | $B_r$ (kG) | $H_{cJ}$ (kOe) | $(BH)_{max}$ (MGOe) | $H_k/H_{cJ}$ (%) |
|---|---|---|---|---|
| S-24 | 13.802 | 16.322 | 46.96 | 69.1 |
| S-25 | 13.812 | 16.211 | 46.99 | 69.2 |
| S-26 | 13.712 | 19.808 | 45.56 | 65.3 |
| S-27 | 13.751 | 18.555 | 45.92 | 66.2 |
| S-28 | 13.791 | 19.820 | 46.23 | 65.6 |
| S-29 | 13.917 | 17.793 | 47.03 | 71.0 |
| S-30 | 13.955 | 17.812 | 47.30 | 72.1 |
| S-31 | 14.021 | 20.423 | 48.21 | 89.2 |
| S-32 | 14.193 | 21.357 | 49.42 | 86.6 |
| S-33 | 13.996 | 20.184 | 47.93 | 88.6 |
| S-34 | 14.009 | 19.567 | 47.99 | 85.7 |
| S-35 | 14.262 | 18.259 | 49.77 | 86.0 |
| S-36 | 13.891 | 19.228 | 47.19 | 83.0 |
| S-37 | 14.107 | 18.933 | 48.81 | 88.6 |
| S-38 | 14.136 | 18.883 | 48.95 | 80.5 |
| S-39 | 14.228 | 18.787 | 49.44 | 85.8 |
| S-40 | 13.478 | 22.627 | 44.41 | 87.7 |
| S-41 | 13.310 | 21.845 | 43.16 | 85.5 |
| S-42 | 14.481 | 15.439 | 51.13 | 87.9 |
| S-43 | 14.621 | 15.350 | 52.24 | 82.5 |
| S-44 | 14.221 | 16.770 | 49.34 | 88.4 |
| S-45 | 14.364 | 16.596 | 50.33 | 86.7 |

Fig. 10

(COMPARATIVE EXAMPLE)

| SAMPLE NO. | $B_r$ (kG) | $H_{cJ}$ (kOe) | $(BH)_{max}$ (MGOe) | $H_k/H_{cJ}$ (%) |
|---|---|---|---|---|
| S-46 | 14.261 | 9.467 | 49.18 | 87.5 |
| S-47 | 14.258 | 8.647 | 48.28 | 82.5 |
| S-48 | 14.319 | 7.013 | 48.12 | 87.0 |
| S-49 | 14.325 | 7.319 | 48.04 | 88.0 |

Fig. 11

(COMPARATIVE EXAMPLE)

| POWDER | MAGNET SAMPLE NO. | MAGNETIC CHARACTERISTICS | | | |
|---|---|---|---|---|---|
| | | $B_r$ (kG) | $H_{cJ}$ (kOe) | $(BH)_{max}$ (MGOe) | $H_k/H_{cJ}$ (%) |
| $Dy_2O_3$ | R-5 | 13.549 | 15.177 | 44.68 | 81.1 |
| $Dy_2O_3$ | R-6 | 14.234 | 13.214 | 49.56 | 78.0 |
| $DyF_3$ | R-5 | 13.794 | 15.076 | 46.23 | 77.1 |
| $DyF_3$ | R-6 | 14.202 | 13.053 | 48.97 | 84.9 |

Fig. 12

| SAMPLE NO. | OXYGEN CONTENT (ppm) | $B_r$ (kG) | $H_{cJ}$ (kOe) | $(BH)_{max}$ (MGOe) |
|---|---|---|---|---|
| R-7 | 5100 | 13.921 | 12.513 | 47.17 |
| R-8 | 3100 | 13.896 | 18.234 | 46.98 |
| R-9 | 2050 | 13.840 | 20.521 | 46.63 |

METHOD FOR PRODUCING SINTERED NDFEB MAGNET

TECHNICAL FIELD

The present invention relates to a method for producing a rare-earth magnet, and particularly to a method for producing a sintered NdFeB magnet with increased coercivity.

BACKGROUND ART

Sintered NdFeB magnets are expected to be in greater demand in the future as a component of the motor of a hybrid car or other devices. Accordingly, a further increase in its coercivity has been demanded. One well-known method for increasing the coercivity $H_{cJ}$ of the sintered NdFeB magnet is to substitute dysprosium (Dy) or terbium (Tb) for a portion of neodymium (Nd). However, Dy and Tb are scarce resources and unevenly distributed. Furthermore, the substitution by these elements decreases the residual magnetic flux density $B_r$ and the maximum energy product $(BH)_{max}$ of the sintered NdFeB magnet.

It has recently been found that the $H_{cJ}$ can be increased with almost no decrease in the $B_r$ of the magnet by applying Dy or Tb to the surface of the sintered NdFeB magnet by sputtering, and then heating it at a temperature of 700° to 1000° C. (Non-Patent Documents 1 to 3). The Dy or Tb applied to the magnet's surface move through the grain boundary of the sintered compact into the compact's body and diffuse from the grain boundary into each particle of the main phase, $R_2Fe_{14}B$, where R is a rare-earth element (This phenomenon is called grain boundary diffusion.) In this process, since the R-rich phase is liquefied by the heat treatment, the diffusion rate of Dy or Tb within the grain boundary is much faster than their diffusion rate from the grain boundary into the main-phase particle. This difference in the diffusion rate can be utilized to adjust the temperature and time of the heat treatment so as to create, over the entire sintered compact, a state where Dy or Tb is present with high concentration only within a region (surface region) in the vicinity of the grain boundary of the main-phase particle of the sintered compact. The coercivity $H_{cJ}$ of the sintered NdFeB magnet depends on the state of the surface region of the main-phase particle; a sintered NdFeB magnet whose crystal grain has a high concentration of Dy or Tb in the surface region will have a high coercivity. Although the increase in the concentration of Dy or Tb lowers the $B_r$ of the magnet, the decrease in the $B_r$ of the entire main-phase particle is negligible since this decrease occurs only within the surface region of each main-phase particle. Thus, the resultant product will be a high-performance magnet having a high $H_{cJ}$ value and yet maintaining the $B_r$ comparable to that of a sintered NdFeB magnet that has not undergone the substitution by Dy or Tb. This technique is called a grain boundary diffusion method.

Methods for industrially producing a sintered NdFeB magnet by the grain boundary diffusion method have already been made public (Non-Patent Documents 4 and 5): One method includes forming a fine powdered layer of a fluoride or oxide of Dy or Tb on the surface of a sintered NdFeB magnet and heating it; and another method includes burying a sintered NdFeB magnet in a mixed powder composed of the powder of a fluoride or oxide of Dy or Tb and the powder of calcium hydride and heating it.

Substituting Ni or Co for a portion of Fe in a sintered NdFeB magnet improves the corrosion resistance of the magnet; increasing the total substitution percentage of Ni and Co to a level higher than 20 to 30% prevents rusting in the anti-corrosion test (at 70° C., at a humidity of 95%, and for 48 hours) (Non-Patent Document 6). However, using a large amount of Ni and Co increases the price of the magnet, and so it has been difficult to industrially use sintered NdFeB magnets produced by this method.

Relevant techniques were also proposed before the grain boundary diffusion method was publicly known, such as the technique of diffusing at least one of the elements Tb, Dy, Al and Ga in the vicinity of the surface of the sintered NdFeB magnet to suppress the high-temperature irreversible demagnetization (Patent Document 1), or the technique of covering the surface of the sintered NdFeB magnet with at least one of the elements Nd, Pr, Dy, Ho and Tb to prevent the deterioration of the magnetic characteristics due to working degradation (Patent Document 2).

Patent Document 1: Japanese Unexamined Patent Application Publication No. H01-117303

Patent Document 2: Japanese Unexamined Patent Application Publication No. S62-074048

Non-Patent Document 1: K. T. Park et al., "Effect of Metal-Coating and Consecutive Heat Treatment on Coercivity of Thin Sintered NdFeB Magnets", *Proceedings of the Sixteenth International Workshop on Rare-Earth Magnets and their Applications* (2000), pp. 257-264

Non-Patent Document 2: Naoyuki Ishigaki et al., "Neojimu Kei Bishou Shouketsu Jishaku No Hyoumen Kaishitsu To Tokusei Koujou (Surface Modification and Characteristics Improvement of Micro-sized Neodymium Sintered Magnet)", *NEOMAX GIHOU* (*NEOMAX Technical Report*), published by Kabushiki Kaisha NEOMAX, vol. 15 (2005), pp. 15-19

Non-Patent Document 3: Ken-ichi Machida et al., "Nd—Fe—B Kei Shouketsu Jishaku No Ryuukai Kaishitsu To Jiki Tokusei (Grain Boundary Modification and Magnetic Characteristics of Sintered NdFeB Magnet)", *Funtai Funmatsu Yakin Kyoukai Heisei* 16 *Nen Shunki Taikai Kouaen Gaiyoushuu* (*Speech Summaries of* 2004 *Spring Meeting of Japan Society of Powder and Powder Metallurgy*), published by the Japan Society of Powder and Powder Metallurgy, 1-47A Non-Patent Document 4: Kouichi Hirota et al., "Ryuukai Kakusan Hou Ni Yoru Nd—Fe—B Kei Shouketsu Jishaku No Kou-hojiryoku-ka (Increase in Coercivity of Sintered NdFeB Magnet by Grain Boundary Diffusion Method)", *Funtai Funmatsu Yakin Kyoukai Heisei* 17 *Nen Shunki Taikai Kouen Gaiyoushuu* (*Abstracts of Autumn Meeting of Japan Society of Powder and Powder Metallurgy*), published by the Japan Society of Powder and Powder Metallurgy, p. 143

Non-Patent Document 5: Ken-ichi Machida et al., "Ryuukai Kaishitsu Gata Nd—Fe—B Kei Shouketsu Jishaku No Jiki Tokusei (Magnetic Characteristics of Sintered NdFeB Magnet with Modified Grain Boundary)", *Funtai Funmatsu Yakin Kyoukai Heisei* 17 *Nen Shunki Taikai Kouen Gaiyoushuu* (*Abstracts of Autumn Meeting of Japan Society of Powder and Powder Metallurgy*), published by the Japan Society of Powder and Powder Metallurgy, p. 144

Non-Patent Document 6: Yasutala Fukuda et al., "Magnetic Properties and Corrosion Characteristics of Nd—(Fe, Co,Ni)—B Pseudo-Ternary Systems", *KaWASAKI STEEL GIHO* (*Kawasaki Steel Technical Report*), published by Kawasaki Steel Corporation, vol. 21(1989), No. 4, pp. 312-315

DISCLOSURE OF THE INVENTION

Problem to be Solved by the Invention

The production of sintered NdFeB magnets by conventional grain boundary diffusion methods has the following problems:

(1) The method of applying Dy or Tb to the surface of the sintered NdFeB magnet by sputtering is unproductive and requires too high a processing cost. Most of the NdFeB magnet products are small-sized, and many of them are produced by the million for each type. Sputtering is inefficient as a means for coating the entire surface of such small objects gathered in such a large quantity.

(2) Both the method including applying the powder of a fluoride or oxide of Dy or Tb to the surface of the magnet and heating it, and the method including burying the magnet into a mixed powder composed of the aforementioned powder and a powder of calcium hydride and heating it, are expensive since, as hereinafter explained, they require many process steps.

According to these methods, the surface of an NdFeB magnet that has been machined is cleaned by washing or pickling so that the magnet can undergo a surface treatment such as nickel plating or aluminum ion plating. Subsequently, a powder of fluoride or oxide is applied to the surface, and the magnet is heated. As a result, a surface layer made of an oxide or fluoride with Nd substituted for a portion of Dy or Tb is formed on the surface of the magnet. In the case of using calcium hydride, the surface layer additionally contains a fluoride or oxide of calcium. The thickness of the surface layer is uneven, which is undesirable since the sintered NdFeB magnet is a high-tech part and requires high dimensional precision. The adhesion between the oxide or fluoride and the sintered NdFeB magnet is so poor that the surface layer will easily come off if it is rubbed with a brush or the like. The magnet cannot work as a high-tech part if a powder is generated from its surface or the coating easily comes off. Accordingly, a machining process such as surface grinding must be reperformed to remove the surface layer so that everything easy to come off is eliminated, and to achieve a required level of geometric dimensional precision. Thus, even if the application of the fluoride or oxide powder is inexpensive, the price of the magnet will be high due to the additionally required steps of removing the surface layer and grinding the surface.

Another well-known method for applying the powder of fluoride or oxide of Dy or Tb to the surface of the sintered NdFeB magnet is to immerse the magnet in an alcoholic suspension of that powder (Non-Patent Document 1). Similar to the previously described method, it is difficult to form a uniform film on the surface of the sintered NdFeB magnet by this method. After the grain boundary diffusion process, if the thickness of the surface layer on the surface of the sintered NdFeB magnet is uneven, it is necessary to entirely remove the surface layer or machine the surface so as to achieve a uniform thickness. Such a process is very expensive.

(3) Dy and Tb are expensive and should desirably be minimally applied. However, the conventional methods may possibly allow the applied substance to be partially excessive or insufficient. The resources of Dy and Tb can be most effectively used if these substances can be uniformly applied over the entire surface of the magnet by the minimum amount required for the grain boundary diffusion.

(4) Another problem exists in that the coercivity of the magnet and the squareness of its magnetization curve are deteriorated due to the machining process for removing the surface layer after the grain boundary diffusion process or the pickling process for completely removing rare-earth oxides. A deterioration in the squareness of the magnetization curve corresponds to a decrease in the coercivity of a portion of the magnet. These phenomena will be remarkable if the magnet is thin. There is a contradiction in performing the machining or pickling process, which deteriorates the coercivity and the squareness of the magnetization curve, after the grain boundary diffusion process for increasing the coereivity has been performed.

(5) The methods described in Patent Documents 1 and 2 are rather ineffective in increasing the coercivity.

Thus, in a method for producing a sintered NdFeB magnet with increased coercivity by a grain boundary diffusion process, the present invention is aimed at achieving the following objectives:

(a) providing a means having a coercivity-improving effect that is much higher than that of the methods disclosed in Patent Documents 1 and 2 and comparable to or higher than that of the method proposed in Non-Patent Document 4 as a technique suitable for industrial applications, (b) forming a surface layer on the surface of the magnet in such a manner that the layer is strongly adhered to the surface, (c) giving the surface layer an appropriate, uniform thickness, and (d) making the surface layer chemically stable and serve as an anticorrosive film for the sintered NdFeB magnet forming the base.

To solve problems (2), (3) and (4), it is necessary to eliminate the needs for removing the surface layer, re-performing the machining or carrying out a chemical process such as pickling after the sintered NdFeB magnet is precisely machined and subjected to a grain boundary diffusion process to increase its coercivity. In other words, if the sintered NdFeB magnet can be used in practical applications immediately after the grain boundary diffusion process, the additional costs that the conventional methods require after the grain boundary diffusion process will be unnecessary, and the deterioration in the magnetic characteristics due to the machining or pickling will additionally be avoided. If the anticorrosion treatment after the machining becomes unnecessary, or if a practically sufficient anticorrosion effect can be obtained by a simple coating, the product's price can be reduced. This price reduction issue is a critical problem in view of the situation where the demand for hybrid car motors or other applications of the sintered NdFeB magnet is expected to drastically expand.

Means for Solving the Problems

To solve the aforementioned problems, the present invention provides a method for producing a sintered NdFeB magnet by a process including applying a substance containing dysprosium and/or terbium to the surface of the sintered NdFeB magnet forming a base body and then heating the magnet to diffuse dysprosium and/or terbium through the grain boundaries thereof and thereby increase the coercivity of the magnet, which is characterized in that:

(1) the applied substance is substantially a metal powder;

(2) the metal powder is composed of a rare-earth element R and an iron-group transition element T, or composed of the elements R, T and another element X, the element X capable of forming an alloy or intermetallic compound with the element R and/or T; and (3) the oxygen content of the sintered NdFeB magnet forming the base body is 5000 ppm or lower.

The oxygen content should preferably be 4000 ppm or lower.

In the method for producing a sintered NdFeB magnet according to the present invention, the iron group transition element T in the metal powder may contain nickel (Ni) and/or cobalt (Co) by a total of 10% or more of the entirety thereof.

The method for producing a sintered NdFeB magnet according to the present invention may preferably include performing the following processes in this order:

(1) applying an adhesive layer on the surface of the sintered NdFeB magnet forming the base body;

(2) putting the sintered NdFeB magnet with the adhesive layer applied thereon, the metal powder and impact media into a container, and vibrating or stirring the content thereof to form a powdered layer made of the metal powder with a uniform thickness on the surface of the sintered NdFeB magnet forming the base body; and (3) heating the sintered NdFeB magnet with the powdered layer formed thereon to cause grain boundary diffusion.

BRIEF DESCRIPTION OF THE DRAWINGS

FIG. 1 is a table showing the alloy composition of fine powders used in the present example, each powder containing either Dy or Tb.

FIG. 2 is a table showing the formulations of fine powders for creating a powdered layer used in the present example.

FIG. 5 is a table showing the composition of strip-cast alloys for creating sintered NdFeB magnets used in the present example.

FIG. 6 is a table showing the grain sizes of the sintered NdFeB magnets used in the present example and the addition or non-addition of oxygen to each magnet.

FIG. 7 is a table showing the magnetic characteristics of the sintered NdFeB magnets used in the present example before the grain boundary diffusion process.

FIG. 8 is a table showing combinations of the sintered NdFeB magnet, metal powder and grain boundary diffusion conditions.

FIG. 9 is a table showing the magnetic characteristics of the sintered NdFeB magnets after the grain boundary diffusion process.

FIG. 10 is a table showing the magnetic characteristics of samples (comparative examples) obtained by performing a grain boundary diffusion process on a high-oxygen sintered compact (magnet sample number: R-6).

FIG. 11 is a table showing the magnetic characteristics of samples (comparative examples) each created by performing a grain boundary diffusion process on a magnet having a powdered layer made of the $Dy_2O_3$ or $DyF_3$ powder.

FIG. 12 is a table showing the magnetic characteristics difference due to the oxygen content of the sintered NdFeB magnet produced in the present example.

EXPLANATION OF NUMERALS

Figure 3:
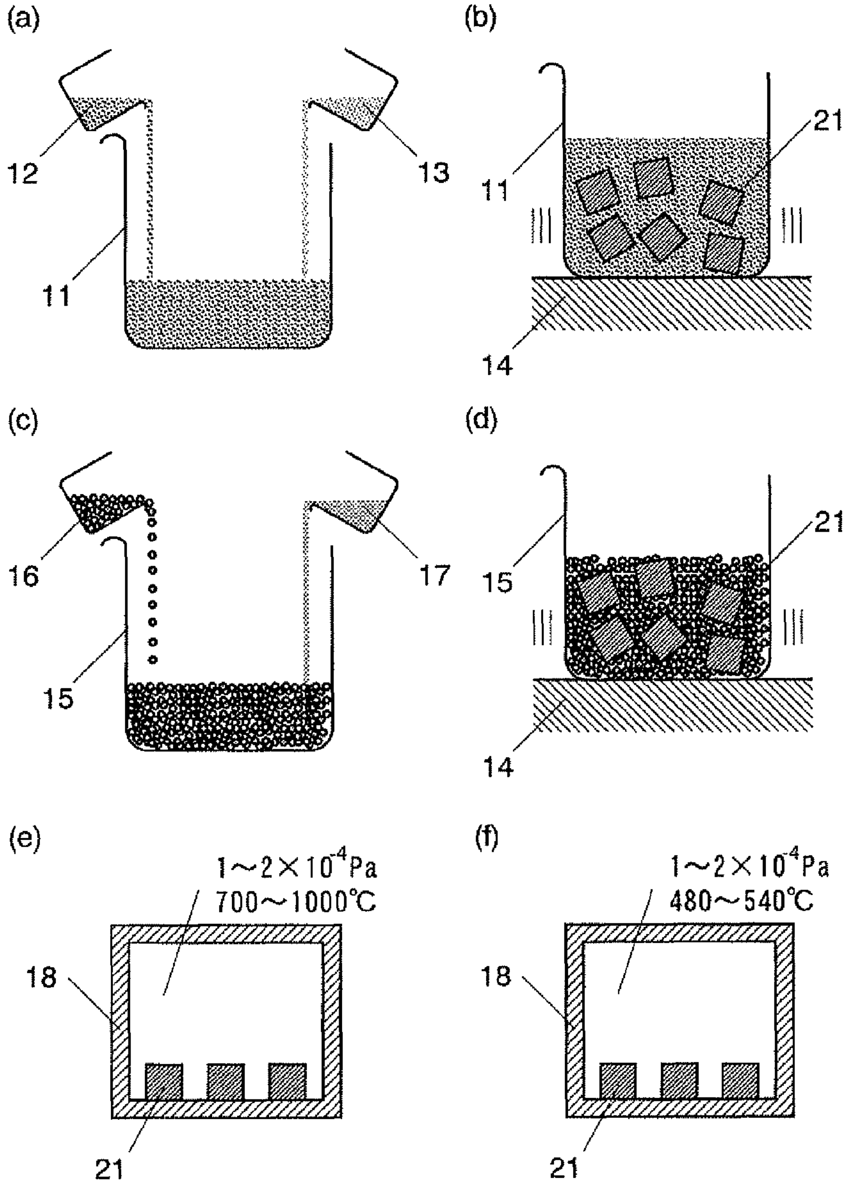
FIG. 3 is a schematic diagram illustrating a method of producing a sintered NdFeB magnet of the present example.

11 . . . Plastic Beaker
12 . . . Zirconia Spherules
13 . . . Liquid Paraffin
14 . . . Vibrator
16 . . . Stainless Steel Balls
17 . . . Metal Fine Powder
18 . . . Vacuum Furnace
21 . . . Sintered NdFeB Magnet
22 . . . Liquid Paraffin Layer
23 . . . Powdered Layer
24 . . . Surface Layer

BEST MODE FOR CARRYING OUT THE INVENTION

The process of producing a sintered NdFeB magnet by a grain boundary diffusion method is normally as follows:

A sintered NdFeB magnet that has been formed into a required shape is initially cleaned. Then, the layer containing Dy and/or Tb at a ratio higher than the average composition of the sintered magnet is formed on the surface of the magnet. Subsequently, the magnet is heated at a temperature of 700° to 1000° C. under vacuum or an inert gas. This heating process is typically carried out at 900° C. for one hour or at 800° C. for ten hours. Under these heating conditions, the grain boundary diffusion process can be easily performed to improve the characteristics of the sintered magnet, i.e. to achieve a higher level of $H_{cJ}$ while maintaining the $B_r$ and $(BH)_{max}$ at the high levels observed before the grain boundary diffusion process. As already reported, the grain boundary diffusion process more effectively works on a thinner magnet, particularly if the thickness is equal to or smaller than 5 mm.

In a method for producing a sintered NdFeB magnet by a grain boundary diffusion process, the present invention is characterized by the method for forming a layer with a high content of Dy and/or Tb on the surface of the magnet. It has been found that the use of a metal powder is the best choice for a strong adhesion of the surface layer to the sintered compact after the grain boundary diffusion process. The metal hereby used may be any metallic substances including pure metals, alloys and intermetallic compounds; also included are boron (B), carbon (C), silicon (Si) and other substances capable of forming alloys or intermetallic compounds with R and/or T.

To achieve the objectives of the present invention, the layer with a high content of Dy and/or Tb on the sintered NdFeB magnet needs to have a uniform thickness. In the case of the conventional method including immersing the magnet in an alcoholic suspension of the powder or burying it in the powder, the surface layer created on the sintered NdFeB magnet after the grain boundary diffusion process is uneven in thickness; its surface is so rough that a precise machining process must be reperformed for many applications that require a sintered NdFeB magnet having high dimensional precision. If the layer formed on the surface of the sintered NdFeB magnet for the grain boundary diffusion process has an appropriate and uniform thickness, the surface layer obtained after the grain boundary diffusion process will also have an appropriate and uniform thickness, so that the resultant magnet, which now has an increased coercivity and improved squareness of the magnetization curve due to the grain boundary diffusion process, can be used as a dimensionally precise part even without reprocessing.

During the grain boundary diffusion process, the metal adheres to the sintered NdFeB magnet by reacting with the base material or being alloyed with it. The main phase of the sintered NdFeB magnet is an intermetallic compound expressed as $R_2Fe_{14}B$, whereas the grain boundary is made of an NdFe or NdFeB alloy with an Nd content of 80 to 90% by weight. When a metallic layer is formed on such an alloy, the surface layer will strongly adhere to the base due to the grain boundary diffusion process. Accordingly, it is best to previously form a metallic layer on the surface.

It is common knowledge that oxides or fluorides of rare-earth elements used in the conventional grain boundary diffusion methods can be poorly adhered to a metal. For example, in the case of producing an oxide or fluoride of an Nd pure metal or NdFeB magnet alloy, the oxide or fluoride of Nd formed on their surface will easily come off from the base.

The metal powder used in the present invention needs to be composed of a rare-earth element R and an iron-group transition element T, or composed of R, T and another element X, where X is an element that can form an alloy or intermetallic compound with R and/or T.

The use of Dy or Tb is essential for increasing the coercivity and for improving the squareness of the magnetization curve. However, both the powder of a pure metal of Dy or Tb and the powder of its hydride (e.g. $RH_2$) or alloy that resembles the pure metal are so chemically active that these powders are industrially difficult to be used as the powder to be applied on the surface of the sintered NdFeB magnet for the grain boundary diffusion process. Therefore, these powders should be preferably made of an alloy of Dy or Tb and an iron-group transition element. The surface layer obtained after the grain boundary diffusion process should not be made of only Dy, Tb or other R elements since these elements are too chemically active for the resultant sintered NdFeB magnet to be practically used without removing the surface layer after the grain boundary diffusion process. The surface layer obtained after the grain boundary diffusion process needs to be made of an alloy or intermetallic compound composed of R (including Dy or Tb) and an additional element. An iron-group transition element T (i.e. Fe, Ni or Co) is the best choice as this additional element. T forms a stable alloy or intermetallic compound with R. Furthermore, T is an important constituent of the sintered NdFeB magnet forming the base. Accordingly, there will be no negative effect on the magnetic characteristics even if Fe, Ni or Co in the powdered layer is diffused into the sintered magnet during the grain boundary diffusion process. The metal powder may further contain an element X other than R and T. For example, the X element may be B, which is a constituent of the sintered NdFeB magnet forming the base, Al or Cu, both of which are known to be useful additive elements. Other examples include Cr and Ti, which can effectively increase the corrosion resistance and mechanical strength of the product after the grain boundary diffusion process.

The alloy may contain hydrogen. Making an alloy store hydrogen for the sake of coarse crushing is a common method (hydrogen pulverization method) used in the process of powdering an alloy of RT or RTB. The hydrogen pulverization method is a technique generally used in the production of the sintered NdFeB magnet. The present invention also uses the hydrogen pulverization method for creating a powder of an alloy containing Dy or Tb, such as DyT, DyTX, TbT or TbTX (where X is B, Al, Cu or other elements). After being hydrogenated, these alloys are ground into a powder with a grain size of 2 to 10 μm, which is suitable for the grain boundary diffusion method, by jet-milling or other fine-grinding techniques. In the present case, hydrogen is released from the alloy powder to the outside of the system during the heating process performed as a grain boundary diffusion process.

An appropriate composition of the metal powder, expressed as a percentage by weight, is as follows: The R content should preferably be 10% or higher and 60% or lower. An R content of 10% or lower impedes the grain boundary diffusion; an R content of 60% or higher causes the surface layer formed after the grain boundary diffusion process to be too chemically active. The R content may more preferably be 25% or higher and 45% or lower. This R (i.e. the entire rare-earth elements including Dy and Tb) needs to contain Dy and/or Tb at a specific percentage or higher. The ratio of Dy and/or Tb to the entirety of R in the metal powder must be higher than the ratio of Dy and/or Tb to the entirety of R in the sintered NdFeB magnet forming the base body. The former ratio must not be lower than 10% even if the content of Dy and Tb in the base body is zero or extremely low. The T content should preferably be 20% or higher and 80% or lower, and more preferably 30% or higher and 75% or lower. The preferable content range of X is from 0 to 30% for Al, from 0 to 20% for Cu, from 0 to 10% for Cr, from 0 to 5% for Ti, from 0 to 5% for B, or from 0 to 5% for Sn. Use of Al, Cu and B as the element X is effective to enhance the coercivity-increasing effect by the grain boundary diffusion process. For Cr, Ti, Sn and many other high-melting metals such as V, Mo, W, Zr and Hf; there is a certain allowable content range for the coercivity-increasing effect by the grain boundary diffusion process. It should be naturally understood that the aforementioned metal powder will be oxidized or nitrided during the powder preparation process or subsequent processes. Furthermore, the powder will be inevitably contaminated by carbon impurities during the powder application process. There exists a certain allowable margin of contamination by these elements in the metal powder.

According to the present invention, the oxygen content of the sintered NdFeB magnet is specified as 5000 ppm or lower.

One of the differences of the present invention from the conventionally known techniques exists in the specification of the oxygen content of the sintered NdFeB magnet. If the oxygen content is not below a certain level, the grain boundary diffusion process will not show its effect, i.e. the coercivity-increasing effect; rather, it may even decrease the coercivity. If the oxygen content exceeds 5000 ppm, the coercivity will not be increased by the grain boundary diffusion process but may decrease even if the sintered NdFeB magnet has an adequately high coercivity before the grain boundary diffusion process. Accordingly, the oxygen content is specified as 5000 ppm or lower in the present invention. The oxygen content should preferably be 4000 ppm or lower, and more preferably 3000 ppm or lower.

If the composition of the metal powder and the oxygen content are included within the appropriate ranges as described previously, the coercivity of the sintered NdFeB magnet will be effectively increased by the grain boundary diffusion process, and the resultant surface layer will be stable and strongly adhered to the base. Due to these characteristics, the sintered NdFeB magnet whose coercivity has been increased as explained previously can be brought into practical use without reprocessing.

The present inventor has found that the surface layer obtained after the grain boundary diffusion process will have an anticorrosion effect if Ni and/or Co is contained in the powdered layer.

A sintered NdFeB magnet that has been produced using a metal powder free from Ni and/or Co will quickly rust if it is directly exposed to a hot and humid atmosphere. This rust adheres so poorly to the base that it can be wiped off with paper. By contrast, a sintered NdFeB magnet with increased coercivity obtained by using a metal powder containing Ni and/or Co at a percentage of 10% or higher of the total of T has been found to barely rust, and this rust adheres so strongly to the base that it will never come off even if it is strongly rubbed with paper. This is very favorable for practical applications. The rusting can be further suppressed by increasing the amount of Ni and/or Co. From the viewpoint of the corrosion resistance of the surface layer, the total content of N and/or Co should preferably be 20% or higher of the total of T, and more preferably 30% or higher. It has been confirmed that the addition of Ni and Co does not negatively affect the original purpose of the grain boundary diffusion process, i.e. the increase in the coercivity.

Substituting Ni and/or Co for a portion of Fe in the sintered NdFeB magnet improves the corrosion resistance of the magnet and prevents it from rusting (Non-Patent Document 6). However, using too much Ni or Co increases the price of the product and hence impedes its practical applications. Putting Ni and/or Co into the metal powder as in the present invention makes the element abundant only in the surface layer and hence causes only a minor increase in the material cost of the entire magnet.

The metal powder used in the present invention should have a grain size of 5 μm or smaller, preferably 4 μm or smaller, and more preferably 3 μm or smaller. Too large a grain size prevents the powder from being alloyed with the base material, and also causes a problem in the adhesion of the resultant surface layer to the base. A smaller grain size leads to a higher density of the surface layer obtained after the heat treatment. The smaller grain size is also favorable for utilizing the surface layer as the anticorrosion film. There is no lower limit to the grain size; a superfine powder of several tens of nanometers in diameter is ideal if the costs can be disregarded. From practical viewpoints, the average grain size of the metal powder should most preferably be approximately from 0.3 μm to 3 μm.

The metal powder used in the present invention may be made from either an alloy powder having a single composition or a mixed powder composed of alloy powders having a plurality of compositions. In the composition of the metal powder in the present invention, no specification is made on hydrogen and resin components, which will be vaporized and released to the outside of the system during the grain boundary diffusion process. Accordingly, neither hydrogen stored for the sake of the easy crushing of the metal or alloy, nor the adhesive layer component used in the process of forming the metal powdered layer, which will be described later, are considered in the calculation of the weight percentages of R, T and X components. As stated earlier, the substance containing Dy and/or Tb applied to the surface of the sintered NdFeB magnet in the present invention is “substantially” a metal powder. The word “substantially” in this context suggests that the powder may contain hydrogen, resin or some inessential components (e.g. an oxide or fluoride of Dy or Tb) that do not negatively affect the adhesion of the surface layer to the base.

A production process using impact media is hereinafter described.

The processes (1) and (2) are a new powder application method developed by the present inventor with his colleagues. Details of this method are disclosed in Japanese Unexamined Patent Application Publication No. H05-302176 and other documents. The present inventor and his colleagues have named this application method the “barrel painting method” or “PB method” and are proceeding with efforts for practically using this method for creating an anticorrosion coating on various magnets and a decorative coating on the casings of electronic devices or the like.

In the present invention, the adhesive layer applied in the first process (1) does not need to be hardened; this layer only needs to hold the metal powder on the surface of the sintered magnet until the grain boundary diffusion process. The adhesive layer will be ultimately vaporized or decomposed during the grain boundary diffusion process; it will not serve for the adhesion of the components in the metal powder to the base after the grain boundary diffusion process. As already explained, the effect of adhesion to the base is the result of the alloying of the components in the metal powder and the base material.

Given these factors, the adhesive layer applied in the process (1) of the present invention is made of a resin that can be easily vaporized or decomposed by heating. Examples of such a resin include a liquid paraffin and a liquid epoxy or acrylic resin free from a hardening agent. The application of the adhesive layer is carried out, for example, by the method described in Japanese Unexamined Patent Application Publication No. 2004-359873. The thickness of this adhesive layer is approximately 1 to 3 μm.

In the next process (2), the sintered NdFeB magnet with the adhesive layer formed thereon, the metal powder and impact media are put into a container, and vibrated or stirred so that the metal powder will be uniformly distributed over and adhered to the surface of the sintered magnet to form the powdered layer. The preferable average grain size of the metal powder used in this process is as previously specified.

FIRST EXAMPLE

Eleven kinds of alloys shown in the table of FIG. 1, each containing Dy or Tb, were prepared by a strip-cast method. Each alloy was then subjected to hydrogen pulverization and jet-milling to obtain fine powders with average grain sizes of approximately 5 μm, 3 μm, 2 μm and 1.5 μm. The grain size was measured with a laser-type grain-size distribution measurement apparatus produced by Sympatec GmbH. The central value $D_{50}$ of the grain size distribution was selected as the average grain size.

In addition to the fine powders of the alloys shown in the table of FIG. 1, fine powders prepared by mixing fine powders of Al, Cu, Ni, Co, Mn, Sn, Ag, Mo and W into the aforementioned powders were also used as the metal powders. The formulations and average grain sizes of these fine powders used in the experiment are shown in the table of FIG. 2.

The formation of a metal powdered layer containing Dy or Tb on the surface of the sintered NdFeB magnet and the grain boundary diffusion process were carried out as follows (refer to FIGS. 3 and 4).

Figure 4:
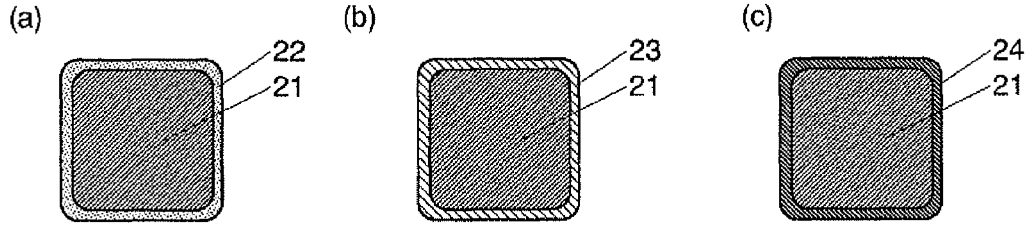
FIG. 4 is a schematic diagram illustrating the change of the sintered NdFeB magnet 21 obtained by the method of producing a sintered NdFeB magnet of the present example.

Process (1): 100 ml of zirconia spherules 12 with a diameter of 1 mm and 0.1 g of liquid paraffin 13 were put into a plastic beaker 11 with a capacity of approximately 200 ml (FIG. 3(*a*)) and thoroughly stirred. Subsequently, sintered NdFeB magnets 21 were put into the beaker 11, and this beaker 11 was vibrated for 15 seconds by pressing its bottom onto a vibrator 14 used in a barrel finishing machine (FIG. 3(*b*)). As a result, a liquid paraffin layer 22 was formed on the surface of the sintered NdFeB magnets 21 (FIG. 4(*a*)).

Process (2): 8 ml of stainless steel balls 16 with a diameter of 1 mm were put into a 10 ml glass bottle 15. Then, 1 g of the aforementioned metal powder 17 was added to the content (FIG. 3(*c*)), and the glass bottle 15 was vibrated by pressing its bottom onto the same vibrator as used in Process (1). Subsequently, the sintered NdFeB magnets 21 with the liquid paraffin layer 22 formed thereon were put into the glass bottle 15, and this bottle was vibrated once more (FIG. 3(*d*)). As a result, a powdered layer 23 composed of the metal powder 17 held by the liquid paraffin was formed on the surface of the sintered NdFeB magnets 21 (FIG. 4(*b*)).

Process (3): The sintered NdFeB magnets covered with the metal powdered layer were put into a vacuum furnace 18 and heated to a temperature of 700° to 100° C. under a vacuum of $1\text{-}2\times10^{-4}$ Pa (FIG. 3(*e*)). After cooling, the magnets were additionally heated at 480 to 540° C. for one hour (FIG. 3(*f*) and eventually cooled to room temperature. These processes were intended for supplying Dy or Tb from the powdered layer 23 into the sintered compact of the sintered NdFeB magnet 21 through the grain boundary of the sintered compact, to increase the coercivity of the sintered NdFeB magnet 21. During these processes, the liquid paraffin contained in the powdered layer 23 was vaporized or decomposed, leaving a surface layer 24 composed of the powdered layer 23 alloyed with the surface of the sintered NdFeB magnet 21 (FIG. 4(*c*)).

In Process (2), the metal powders containing Dy or Tb were all handled in a glove box filled with a high-purity argon gas. During the transition from Process (2) to Process (3), the sample was contained in a lidded container having a slight gap between the lid and the container, the gap being designed so that practically no air could pass through it at normal pressures while the argon gas in the container could be discharged through it only under high vacuum. After being filled with the argon gas, the container was taken out from the glove box and immediately moved into the vacuum furnace. Thus, the metal powder was prevented from being exposed to air during the transition from Process (2) to Process (3). In Process (3), the argon gas in the container was discharged through the gap to the outside of the container.

The sintered NdFeB magnet 21 was prepared by the following procedure: Alloys having the compositions shown in the table of FIG. 5 were prepared by a strip-cast method, and ground into fine powders in a nitrogen gas by hydrogen pulverization and jet-milling. The fine powders were prepared under two different conditions: Under the first condition, approximately 1000 ppm of oxygen was introduced into the nitrogen gas to slightly oxide the fine powder; under the second condition, the fine grinding was performed in a high-purity nitrogen gas to lower the oxygen content of the fine powder to the lowest possible level. The operational conditions of the jet mill were controlled so as to produce two kinds of powders having average diameters of $D_{50}$=5 μm and 3 μm, respectively. The grain size was measured with a laser-type grain-size distribution measurement apparatus produced by Sympatec GmbH. The powder of $D_{50}$=5 μm was oriented and molded by a normal transverse-field press method, and then sintered. The powder of $D_{50}$=5 μm was filled into a stainless container with a cylindrical cavity of 12 mm in diameter and 10 mm in depth, to a loading density of 3.6 g/cm$^3$. After the container was lidded, a pulsed magnetic field of 9 T was applied in the axial direction of the cylinder to orient the powder within the cavity, after which the powder, as contained in the stainless container, was sintered under vacuum. The sintering temperature was changed within a range from 950° to 1050° C., and a magnet created under the conditions that yielded the best magnetic characteristics was used as a sample. After the sintering process, the magnet was subjected to heat treatment and machined into rectangular solids measuring 7×7×4 mm (the direction of 4 mm coinciding with the magnetization direction). The heat treatment included a one-hour heating step at 800° C., followed by a rapid cooling step, and another one-hour heating step at 480° to 540° C., followed the final rapid cooling step. The sintered NdFeB magnet samples produced in this manner are listed in FIG. 6. In the table of FIG. 6, the item "Addition of Oxygen" indicates whether or not oxygen was introduced into the nitrogen gas during the fine-grinding process by the jet mill. Adding oxygen in the grinding process stabilizes the powder, so that the resultant powder will not burn even if it is brought into contact with air. The powder produced by the fine-grinding process without the addition of oxygen is extremely active and will catch fire if it is exposed to air. A magnet created by using a fine powder produced without the addition of oxygen can have a higher level of coercivity than a magnet created by using a fine powder produced with the addition of oxygen. The oxygen contents of the sintered compacts were as follows: 2000 to 3500 ppm in the cases of R-1 to R-4 shown in FIG. 6, 1500 to 2500 ppm in the case of R-5, and 4500 to 5500 ppm in the case of R-6. The magnetic characteristics after the optimal heat treatment of the magnets R-1 to R-6 listed in FIG. 6 were as shown in the table of FIG. 7.

A grain boundary diffusion experiment was performed for each of the forty-nine combinations of the sintered NdFeB magnet, metal powder and grain boundary diffusion conditions (temperature and time) shown in the table of FIG. 8, to determine the magnetic characteristics of each of the processed magnets. Every sintered NdFeB magnet was shaped into a rectangular solid having a thickness of 4 mm and a square section with a side length of 7 mm. The magnetization direction was parallel to the thickness direction. By the previously described process, the metal powder was applied to the sintered compact and then heated, which caused the adhesion of the metal powder to the sintered compact and the diffusion of Dy or Tb through the grain boundary. Thus, the coercivity of the sintered magnet was increased. For each of the forty-nine samples, it was confirmed that the powdered layer was strongly adhered to the sintered compact. The thickness of the surface layer created in this manner ranged from 5 to 100 μm. The thickness can be changed by varying the grain size, composition and heating conditions of the powder. As already explained, it was confirmed that the powdered layer was strongly adhered to the sintered compact of each of the forty-nine samples. The high adhesion strength was confirmed by a test in which the sample was strongly rubbed against paper, and by a cross-cut adhesion test which included the steps of forming a cross cut of 1×1 mm in size on the surface of the sample, attaching a gum tape onto the cut portion, and forcefully removing the tape. It was also confirmed for all the samples that the surface layer after the sintering and grain boundary diffusion process had an almost uniform thickness over the entire sample surface.

It was confirmed that, when the surface layer was created from one of the alloy powders A-1 to A-8 each containing Ni or Co, the sintered NdFeB magnet after the grain boundary diffusion had higher corrosion resistance than the sintered NdFeB magnet on which the surface layer was not formed. Also confirmed was that the corrosion product that had been created on such a surface layer was strongly adhered. These confirmations prove that the surface layer has the effect of providing the sintered NdFeB magnet with corrosion resistance. However, this does not guarantee long-term corrosion resistance in hot and humid conditions. For applications associated with a severely corrosive environment, it is necessary to form an anticorrosion coating on the surface layer by resin coating or plating. For example, a magnet with no surface layer formed thereon and a magnet that had undergone a grain boundary diffusion process using an alloy powder with a high content of Ni or Co, were exposed to an atmosphere at a temperature of 70° C. and relative humidity of 70% for one hour. As a result, clear rust spots were observed on the former magnet; these rust spots were easily removed by rubbing them against paper. By contrast, no rust was observed on the latter magnet, or only a small number of rust spots were observed at its sharp corners. It was confirmed that these spots formed at the corners were also strongly bonded to the base. Having such a moderate corrosion resistance is practically favorable from the following viewpoints:

(1) The product will be prevented from corrosion during transportation or storage even if it is shipped without a surface treatment.

(2) In the case of interior permanent magnet (IPM) motors, the magnet will be embedded into a slot and sealed with a resin. In such a case, the moderate corrosion resistance suffices for the magnet to be used as is (without a surface treatment).

The magnetic characteristics of the samples listed in FIG. 8 are shown in FIG. 9 (S-1 to S45) and FIG. 10 (S-45 to S-49). Comparing the characteristics of the magnets before the grain boundary diffusion process (FIG. 7) with those after the grain boundary diffusion process (FIG. 9) shows that the characteristics of all the samples S-1 to S-45 improved due to the grain boundary diffusion process. In the case where a high-oxygen sintered compact was used, the coercivity somewhat decreased due to the grain boundary diffusion process, as shown in FIG. 10. The high-oxygen sintered compact used in the present experiment had an oxygen content of 5300 ppm. It has been confirmed that the grain boundary diffusion process will be ineffective if the oxygen content of the sintered compact is 5000 ppm or higher.

For comparison, an experiment based on a conventional grain boundary diffusion method using $Dy_2O_3$ and $DyF_3$ was performed using sintered NdFeB magnets similar to those used in the previously described example. The result is shown in FIG. 11. This result confirms the following facts:

(1) The use of $Dy_2O_3$ and $DyF_3$ powders for the grain boundary diffusion process causes an increase in the coercivity. The result shown in this table, in combination with the results of the other experiments performed under various conditions, proves that the method using a metal powder according to the present invention provides a greater increase in the coercivity by the grain boundary diffusion process than can be attained by the method using $Dy_2O_3$ and $DyF_3$.

(2) The method using $Dy_2O_3$ and $DyF_3$ is effective in improving the coercivity by the grain boundary process even if the sintered magnet contains a high concentration of oxygen. Thus, it has been found that the conventional method using an oxide or fluoride can yield the effect of the grain boundary diffusion even for high-oxygen sintered compacts.

(3) In the case of the samples that had undergone the grain boundary diffusion process using an oxide or fluoride, the surface layer after the grain boundary diffusion process was so poorly adhered that the surface layer could be removed even by softly rubbing the sample against paper. However, it was confirmed that a machining or pickling process was necessary to completely remove that layer.

As just described, the coercivity of the samples in the present example shown in FIG. 8 was higher than that of the samples used in the comparative examples shown in FIG. 11. This confirms that the method according to the present invention is superior to the conventional method in terms of the coercivity-increasing effect. The authors of Non-Patent Documents 1 to 5 relating to the grain boundary diffusion process also claim that their methods increased the coercivity to a level higher than that of a sample prepared by conventional methods (at the date of publication of each document). Non-Patent Documents 1 to 5 disclose experimental results, which demonstrate that remarkable effects were obtained primarily when Tb was used, although Dy was also used in some of those experiments. However, the idea of using Tb is impractical since Tb is rarer than Dy and five times as expensive as the latter material. The method according to the present example used Dy in most of the experiments and yet achieved remarkable effects in terms of the coercivity.

Increasing the thickness of the sintered compact sample reduces the effect of the grain boundary diffusion process. Therefore, the thickness of the sintered compact sample is an important factor in the experiment. In the ease of Non-Patent Document 1 to 5, the thickness of the sintered compact samples was 0.7 mm (Non-Patent Document 1), 0.2 to 2 mm (Non-Patent Document 2), 2.7 mm (on-Patent Document 3), and 1 to 5 mm (Non-Patent Document 4). (The thickness of the sintered compact sample is not specified in Non-Patent Document). On the other hand, the sintered compact samples used in the present example was 4 mm, which is thicker than those disclosed in those non-patent documents except for Non-Patent Document 4. In the case of Non-Patent Document 4, when the thickness of the sintered compact sample was 4 mm, the maximum coercivity was $1.12\times10^6$ A/m=14.5 kOe (at a heating temperature of 1073K in the grain boundary diffusion process; calculated from FIG. 2 of Non-Patent Document 4). This value is smaller than achieved in the present example (and it should be noted that this data was obtained with Tb). Thus, the method according to the present invention is also superior to those described in Non-Patent Documents 1 to 5 in terms of the thickness of the sintered compact magnet.

SECOND EXAMPLE

A strip-cast alloy having the composition M-1 was ground by the same method as in the first example to obtain a powder with $D_{50}$=5 μm. Similar to the first example, the fine-grinding process was performed under different conditions, i.e. by mixing 100 to 3000 ppm of oxygen into nitrogen in the jet-milling process in one case or using pure nitrogen in another case, to obtain three kinds of fine powders differing in oxygen content. These powders were molded by a transverse magnetic-field molding method and sintered at a temperature of 980° to 1050° C. to obtain sintered compacts. These sintered compacts are hereinafter referred to as R-7, R-8 and R-9. R-7 to R-9 were subject to the heat treatment as in the first example, and three rectangular solid samples measuring 7 mm×7 mm×4 mm (the direction of 4 mm coinciding with the magnetization direction) were prepared for each of the sintered compacts. The average values of the oxygen contents of R-7 to R-9 are shown in FIG. 12. A grain boundary diffusion process using the powder P-4 was performed on R-7 to R-9 by the same method as described in the first example. The grain boundary diffusion process was carried out at 900° C. for one hour. After the grain boundary diffusion process, a heat treatment was carried out as in the first example. The magnetic characteristics of the magnets R-7 to R-9 after an optimal heat treatment were as shown in FIG. 12. Those values each show an average value of the three samples. As is evident from FIG. 12, the coercivity of the magnets after the grain boundary diffusion process increases with the decrease in the oxygen content of the magnets. The present example demonstrates that (1) when the oxygen content of the magnet is 5000 ppm or higher, the grain boundary diffusion process has only a minor effect of increasing the coercivity or may even decrease the coercivity. Accordingly, it is impossible to increase the coercivity without reducing the oxygen content to 5000 ppm or lower. It is evident from FIG. 12 that the oxygen content should preferably be 4000 ppm or lower, and more preferably 3000 ppm or lower.

The invention claimed is:

1. A method for producing a sintered NdFeB magnet, comprising:

applying a substance to a surface of the sintered NdFeB magnet, the substance being substantially a metal powder comprising (i) a rare earth element component (R) that is dysprosium and/or terbium and optionally at least one other rare earth element and (ii) an iron group transition element component (T) that is at least one member selected from the group consisting of iron, cobalt, and nickel; and then heating the magnet to diffuse dysprosium and/or terbium through grain boundaries of the magnet in order to increase coercivity of the magnet, wherein an oxygen content of the sintered NdFeB magnet is 5000 ppm or lower.

2. The method for producing a sintered NdFeB magnet according to claim 1, wherein the oxygen content is 4000 ppm or lower.

3. The method for producing a sintered NdFeB magnet according to claim 1, wherein nickel and/or cobalt total 10% or more by weight of the iron group transition element component (T).

4. The method for producing a sintered NdFeB magnet according to claim 1, comprising:

applying an adhesive layer on the surface of the sintered NdFeB magnet;

putting the sintered NdFeB magnet with the adhesive layer applied thereon, the metal powder and an impact media into a container;

vibrating or stirring a content of the container to form a powdered layer made of the metal powder with a uniform thickness on the surface of the sintered NdFeB magnet; and heating the sintered NdFeB magnet with the powdered layer formed thereon to cause grain boundary diffusion.

5. The method for producing a sintered NdFeB magnet according to claim 2, wherein nickel and/or cobalt total 10% or more by weight of the iron group transition element component (T).

6. The method for producing a sintered NdFeB magnet according to claim 2, comprising:

applying an adhesive layer on the surface of the sintered NdFeB magnet;

putting the sintered NdFeB magnet with the adhesive layer applied thereon, the metal powder and an impact media into a container;

vibrating or stirring a content of the container to form a powdered layer made of the metal powder with a uniform thickness on the surface of the sintered NdFeB magnet; and heating the sintered NdFeB magnet with the powdered layer formed thereon to cause grain boundary diffusion.

7. The method for producing a sintered NdFeB magnet according to claim 3, comprising:

applying an adhesive layer on the surface of the sintered NdFeB magnet;

putting the sintered NdFeB magnet with the adhesive layer applied thereon, the metal powder and an impact media into a container;

vibrating or stirring a content of the container to form a powdered layer made of the metal powder with a uniform thickness on the surface of the sintered NdFeB magnet; and heating the sintered NdFeB magnet with the powdered layer formed thereon to cause grain boundary diffusion.

8. The method for producing a sintered NdFeB magnet according to claim 5, comprising:

applying an adhesive layer on the surface of the sintered NdFeB magnet;

putting the sintered NdFeB magnet with the adhesive layer applied thereon, the metal powder and an impact media into a container;

vibrating or stirring a content of the container to form a powdered layer made of the metal powder with a uniform thickness on the surface of the sintered NdFeB magnet; and heating the sintered NdFeB magnet with the powdered layer formed thereon to cause grain boundary diffusion.

9. The method for producing a sintered NdFeB magnet according to claim 1, wherein the rare earth element component (R) is 10% to 60% by weight of the metal powder.

10. The method for producing a sintered NdFeB magnet according to claim 9, wherein the rare earth element component (R) is 25% to 45% by weight of the metal powder.

11. The method for producing a sintered NdFeB magnet according to claim 1, wherein the iron group transition element component (T) is 20% to 80% by weight of the metal powder.

12. The method for producing a sintered NdFeB magnet according to claim 11, wherein the iron group transition element component (T) is 30% to 75% by weight of the metal powder.

13. The method for producing a sintered NdFeB magnet according to claim 3, wherein nickel and/or cobalt total 20% or more by weight of the iron group transition element component (T).

14. The method for producing a sintered NdFeB magnet according to claim 1, wherein an average grain size of the metal powder is 5 μm or smaller.

15. The method for producing a sintered NdFeB magnet according to claim 14, wherein the average grain size is 0.3 to 3 μm.

16. The method for producing a sintered NdFeB magnet according to claim 1, wherein the metal powder further comprises an element (X) capable of forming an alloy or intermetallic compound with the rare earth element component (R) and/or the iron group transition element component (T).

17. The method for producing a sintered NdFeB magnet according to claim 1, wherein the substance is applied to the surface of the magnet without sputtering.

18. The method for producing a sintered NdFeB magnet according to claim 1, wherein the substance is applied to the surface of the magnet using an adhesive.

19. The method for producing a sintered NdFeB magnet according to claim 1, wherein the metal powder comprises no more than insubstantial amounts of oxides and/or fluorides of dysprosium and/or terbium.

* * * * *